United States Patent [19]

Craig et al.

[11] Patent Number: 5,786,753
[45] Date of Patent: Jul. 28, 1998

[54] VEHICLE HAVING A DECELERATION RATE SIGNAL GENERATOR INCORPORATED THEREIN

[76] Inventors: Bryant F. Craig, 412 Northview Dr., Richardson, Tex. 75080; Randy L. McClanahan, 2323 Augusta, No. 5, Houston, Tex. 77057

[21] Appl. No.: 689,378

[22] Filed: Aug. 8, 1996

Related U.S. Application Data

[63] Continuation-in-part of Ser. No. 423,790, Apr. 18, 1995.

[51] Int. Cl.$^6$ .................................................... B60Q 1/50
[52] U.S. Cl. .................. 340/467; 340/469; 200/61.45 R; 200/61.47
[58] Field of Search ..................... 340/467, 464, 340/669; 200/61.45 R, 61.47

[56] References Cited

U.S. PATENT DOCUMENTS

| | | | |
|---|---|---|---|
| 3,593,278 | 7/1971 | Bower | 340/464 |
| 5,172,095 | 12/1992 | Scott | 340/479 |
| 5,404,130 | 4/1995 | Lee et al. | 340/479 |

*Primary Examiner*—Jeffery Hofsass
*Assistant Examiner*—Julie Lieu
*Attorney, Agent, or Firm*—Konneker & Smith, P.C.

[57] ABSTRACT

A vehicle provides an indication of its rate of deceleration. In a preferred embodiment, a vehicle has a deceleration rate signal generator incorporated therein. The signal generator includes a number of inertial switches, an oscillator, and four Schmitt triggers. The signal generator may be easily retrofit into existing vehicles, or may be installed in the vehicle when it is manufactured.

25 Claims, 3 Drawing Sheets

VEHICLE HAVING A DECELERATION RATE SIGNAL GENERATOR INCORPORATED THEREIN

CROSS-REFERENCE TO RELATED APPLICATION

The present application is a continuation-in-part of U.S. patent application Ser. No. 08/423,790, filed Apr. 18, 1995 entitled DECELERATION RATE SIGNAL GENERATOR, and having Bryant F. Craig and Randy L. McClanahan as inventors thereof. The disclosure of that U.S. patent application is hereby incorporated by reference.

BACKGROUND OF THE INVENTION

The present invention relates generally to deceleration warning systems in vehicles and, in a preferred embodiment thereof, more particularly provides a deceleration rate signal generator which is incorporated into a vehicle.

The most basic vehicle deceleration warning system consists of a switch interconnected between a vehicle's battery and a warning light. The switch is closed when an operator of the vehicle depresses the vehicle's brake pedal, usually causing deceleration of the vehicle. Typically, the warning light is positioned on the vehicle so that operators of following vehicles will receive an indication that deceleration of the vehicle is occurring.

An improved vehicle deceleration warning system not only indicates that the vehicle is decelerating, but also indicates the rate at which the vehicle is decelerating. Other improved warning systems indicate relative rates of vehicle deceleration. Still further improved warning systems provide indications of vehicle deceleration rates which intuitively impress on following vehicle operators the heightened levels of danger associated with increased rates of vehicle deceleration.

U.S. Pat. No. 5,089,805 to Salsman discloses a vehicle deceleration warning system which indicates the rate at which a vehicle is decelerating. Increasing numbers of warning lights are lighted by the system in response to increased rates of vehicle deceleration. Unfortunately, the Salsman system is complex in its configuration, requires mounting of a somewhat free-swinging pendulum within the vehicle, and requires a multitude of warning lights. Additionally, the Salsman system cannot be conveniently retrofit into existing vehicles.

U.S. Pat. No. 3,528,056 to Voevodsky discloses a vehicle deceleration warning system which utilizes a flashing warning light to indicate the rate at which a vehicle is decelerating. The rate of flashing of the warning light corresponds to the rate of deceleration of the vehicle. Voevodsky also discloses a system wherein the warning light is lighted for variable proportions of each duty cycle, the "on" time of the warning light corresponding to the rate of deceleration of the vehicle. The Voevodsky system, however, causes the warning light to flash at any time the vehicle's brakes are applied, and does not continue to flash the warning light when the brakes are released. The Voevodsky system would also be difficult to retrofit into an existing vehicle's brake light system.

U.S. Pat. No. 5,172,095 to Scott discloses a vehicle deceleration warning system which causes a warning light to flash whenever the vehicle's brakes are applied. Upon release of the brakes, the warning light continues to flash for a time period determined by a timer module. This system has several disadvantages, for example, the warning light flashes at a rate which is unrelated to the rate of the vehicle's deceleration, and the system is difficult to retrofit into an existing vehicle's brake light system.

U.S. Pat. No. 3,593,278 to Bower et al. discloses a vehicle deceleration warning system including a multivibrator network. The multivibrator network utilizes multiple transistors and multiple resistance-capacitance networks connected thereto. Mercury switches are connected in parallel with corresponding series-connected resistors, so that, when each mercury switch is closed, a change is produced in one of the resistance-capacitance networks to thereby cause a corresponding change in a rate of flashing of a warning light connected to one of the transistors. Unfortunately, the Bower et al. system causes the vehicle's brake lights to flash at any time the vehicle's brakes are applied, is very difficult to retrofit into an existing vehicle's brake system, and has no provision for continuing to flash the warning light after the brakes have been released.

From the foregoing, it can be seen that it would be quite desirable to provide a vehicle having a deceleration rate warning system incorporated therein which does not cause a warning light to flash unless a predetermined level of deceleration has been exceeded, but which flashes the warning light at a rate corresponding to the vehicle's rate of deceleration and continues to flash the warning light for a predetermined period after the vehicle's brakes have been released, the rate of flashing after the brakes have been released being the same as the rate of flashing just prior to the brakes being released. It would also be desirable to provide a deceleration rate signal generator having the above features and which may be conveniently and economically retrofit into existing vehicles. It is accordingly an object of the present invention to provide such a vehicle and deceleration rate signal generator.

SUMMARY OF THE INVENTION

In carrying out the principles of the present invention, in accordance with an embodiment thereof, a vehicle is provided which incorporates a deceleration rate signal generator therein. The deceleration rate signal generator may also be separately provided, for retrofitting into an existing vehicle. The signal generator provides a visual indication of rates of deceleration of the vehicle, permits continuous illumination of a warning light when the vehicle's brakes are applied but the vehicle's deceleration is not more than a predetermined level, and continues the indication of rate of deceleration after the vehicle's brakes have been released. In one aspect of the present invention, the continued indication of rate of deceleration is in the nature of a flashing of the warning light at a frequency corresponding to the rate of deceleration of the vehicle immediately prior to the vehicle's brakes being released. In another aspect of the present invention, the continued indication of rate of deceleration is for a period of time corresponding to the rate of deceleration of the vehicle immediately prior to the vehicle's brakes being released.

In broad terms, a deceleration rate signal generator for use with a vehicle having a voltage source, a brake switch connected to the voltage source, and a light connectable to the voltage source is provided. The signal generator includes a plurality of inertial switches, a plurality of voltage dividers, an oscillator, and four Schmitt triggers.

The inertial switches are configured to close successively in response to successively increasing levels of deceleration of the vehicle. Each of the inertial switches is connected to the brake switch when the signal generator is installed in the vehicle. Each of the voltage dividers is connected to one of the inertial switches.

The oscillator has a voltage input, a gate input, and an output. The oscillator voltage input is connected to each of the voltage dividers.

Each of the Schmitt triggers has first and second inputs and an output. The first one of the Schmitt triggers has its first input connected to one of the inertial switches, its second input connected to the voltage source when the signal generator is installed in the vehicle, and its output connected to the gate input of the oscillator. The second one of the Schmitt triggers has its first input connected to the first Schmitt trigger output, and its second input is connected to the brake switch when the signal generator is installed in the vehicle. The third one of the Schmitt triggers has its first input connected to the second Schmitt trigger output, and its second input is connected to the voltage source when the signal generator is installed in the vehicle. The fourth one of the Schmitt triggers has its first input connected to the first Schmitt trigger output, its second input is connected to the voltage source when the signal generator is installed in the vehicle, and its output connected to the oscillator voltage input.

Also provided is a deceleration rate signal generator for use with a vehicle having a voltage source, a brake switch connected to the voltage source, and a light connectable to the voltage source. The deceleration rate signal generator includes a plurality of inertial switches, a plurality of voltage dividers, an oscillator, a transistor, and four Schmitt triggers.

The inertial switches are configured to close successively in response to successively increasing levels of deceleration of the vehicle. Each of the inertial switches is connectable to the brake switch when the signal generator is installed in the vehicle. Each of the voltage dividers is connected to one of the inertial switches.

The oscillator has a voltage input, a gate input, and an output. The oscillator voltage input is connected to each of the voltage dividers.

The transistor has a base, a collector, and an emitter. The base is connected to each of the voltage dividers. The collector is connected to the voltage source.

Each of the Schmitt triggers has first and second inputs and an output. The first one of the Schmitt triggers has its first input connected to the first transistor emitter, its second input being connectable to the voltage source when the signal generator is installed in the vehicle, and its output connected to the gate input of the oscillator. The second one of the Schmitt triggers has its first input connected to the first Schmitt trigger output, and its second input being connectable to the brake switch when the signal generator is installed in the vehicle. The third one of the Schmitt triggers has its first input connected to the second Schmitt trigger output, and its second input is connectable to the voltage source when the signal generator is installed in the vehicle. The fourth one of the Schmitt triggers has its first input connected to the first Schmitt trigger output, its second input being connectable to the voltage source when the signal generator is installed in the vehicle, and its output connected to the oscillator voltage input.

Additionally, a deceleration rate signal generator is provided which includes means capable of sensing successive levels of deceleration of a vehicle; means for generating a frequency output, the generating means being connected to the sensing means, and the frequency output being capable of having levels thereof corresponding to the levels of deceleration; and means, connected to the generating means, for continuing the frequency output for a predetermined period of time after the sensing means discontinues sensing deceleration of the vehicle.

The use of the disclosed vehicle solves the problems associated with indicating to following drivers a rate of deceleration of the vehicle. In addition, the use of the disclosed signal generator permits existing vehicles to be conveniently and economically retrofit with the system.

DETAILED DESCRIPTION

Figure 1:
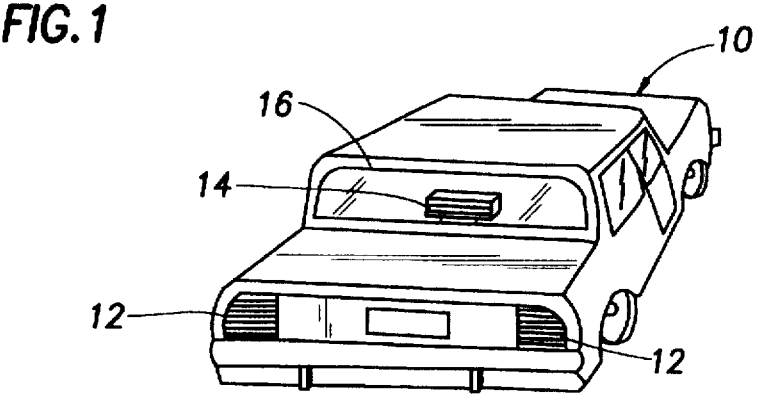
FIG. 1 is a rear perspective view of a vehicle embodying principles of the present invention, the vehicle having a deceleration rate signal generator incorporated therein.

Illustrated in FIG. 1 is a vehicle 10 which embodies principles of the present invention. Representatively, the vehicle 10 is a passenger car, but it is to be understood that the vehicle may be a truck, bus, or any other vehicle wherein it may be desired to provide an indication of the vehicle's rate of deceleration.

As is typically provided in modern passenger cars, the vehicle 10 includes two light assemblies 12 mounted at a rear portion of the vehicle, and a third light assembly 14 mounted so that it may be viewed through a rear window 16 of the vehicle. The light assemblies 12 conventionally include tail lights (not shown) which are lighted when the vehicle's front running lights and/or headlights are lighted, and brake lights (not shown) which are lighted when the vehicle's brakes are applied. It is to be understood that the tail lights and/or brake lights may be otherwise configured without departing from the principles of the present invention.

In a conventional passenger car, the light assembly 14 includes a brake light which is lighted continuously when the car's brakes are applied. In accordance with the principles of the present invention, the light assembly 14 of the vehicle 10 shown in FIG. 1 includes a unique deceleration rate signal generator 24, which, in one aspect of its operation, flashes a warning light 90 (see FIG. 2) when the vehicle's brakes are applied, with the rate of flashing corresponding to a rate of deceleration of the vehicle. It is to be understood that the deceleration rate signal generator 24 may be otherwise positioned within the vehicle 10 without departing from the principles of the present invention.

Figure 2:
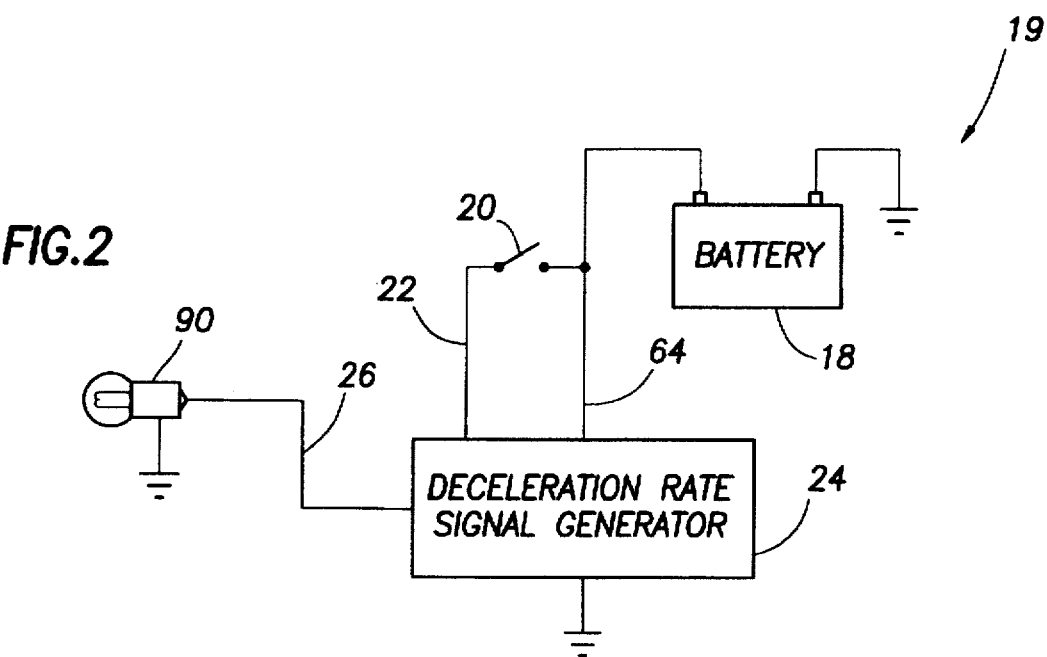
FIG. 2 is a block diagram of a brake light system of the vehicle of FIG. 1, the brake light system embodying principles of the present invention.

It is a distinct advantage of the present invention that the signal generator 24 as hereinbelow described in greater detail is very compact and requires very few interconnections to a vehicle's brake light system. Referring additionally now to FIG. 2, a block diagram of a brake light system 19 of the vehicle 10 is representatively illustrated. It may now be readily appreciated that the signal generator 24 has only two inputs, a line 64 connected to a battery 18 (or other voltage source of the vehicle 10), and a line 22 connected to a brake switch 20 of the vehicle. An output of the signal generator 24 is connected to the light 90 via line 26.

Thus, where it is desired to retrofit the signal generator 24 into an existing vehicle, the signal generator 24 must merely be interconnected between the existing light (such as light 90) and the existing brake switch (such as switch 20), connected to a voltage source (such as battery 18), and provided with a ground connection. These connections may be conveniently accomplished within a typical light assembly (such as light assembly 14), wherein lines (such as lines 22 and 26) and a ground connection are preexisting.

The brake switch 20 of the vehicle 10 closes when the vehicle's brakes are applied, and opens when the vehicle's brakes are released. The light 90 is visible in the light assembly 14 to drivers of following vehicles. As more fully described hereinbelow, the signal generator 24 causes the light 90 to flash when the switch 20 is closed and the vehicle's deceleration exceeds a predetermined level. When the light 90 is caused to flash, it flashes at a rate corresponding to the rate of deceleration of the vehicle 10. In another aspect of the present invention, the light 90 continues to flash for a predetermined period of time after the switch 20 opens, and, during the predetermined period of time after the switch 20 opens, the light 90 flashes at the rate it flashed just prior to the switch being opened.

Figure 3:
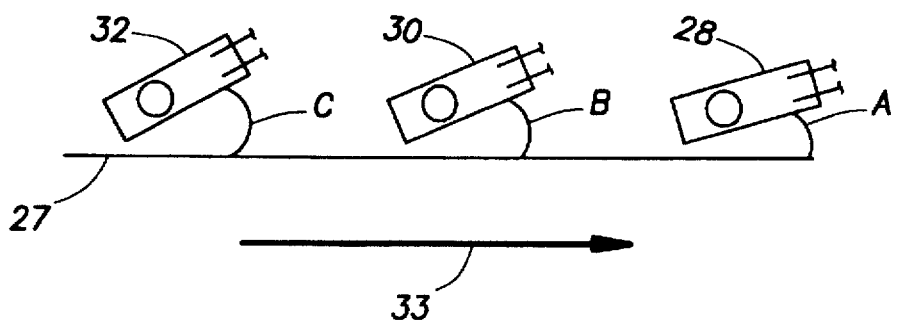
FIG. 3 shows side elevational views of three mercury switches included in the brake light system of FIG. 2.
Figure 4:
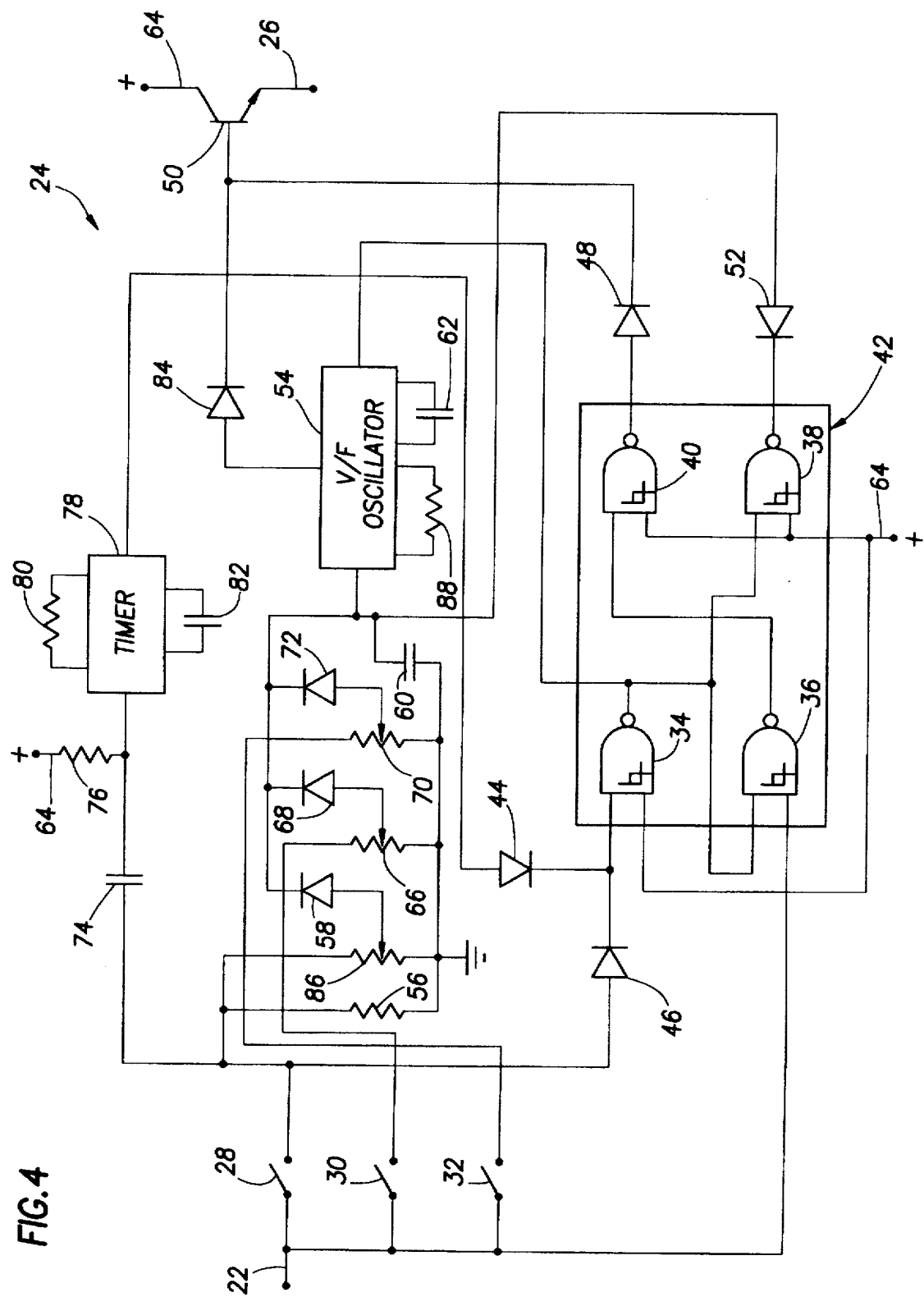
FIG. 4 is a circuit diagram of a first deceleration rate signal generator embodying principles of the present invention, the signal generator being usable in the brake light system of FIG. 2.

Referring additionally now to FIG. 3, three mercury switches 28, 30, and 32 are representatively illustrated. Each of the mercury switches 28, 30, and 32 are conventional, the switches being closed when a small amount of mercury therein makes contact between two conductors mounted thereto. In the signal generator 24 of the present invention, the switches 28, 30, and 32 are mounted with respect to a generally horizontal plane, such that the switches are successively closed at successively increasing levels of deceleration of the vehicle 10.

With arrow 33 indicating a forward direction of travel of the vehicle 10, the switches 28, 30, and 32 are mounted so that deceleration of the vehicle 10 causes the mercury within each of the switches to be biased toward making contact between the two conductors. It is to be understood that other types of inertial switches (as, for example, accelerometers, relays, and mechanically biased switches) may be utilized in the signal generator 24 without departing from the principles of the present invention.

Switch 28 is mounted at an angle A with respect to a horizontal plane 27. Applicants prefer that angle A is approximately 16 degrees, although other angles may be utilized without departing from the principles of the present invention. Testing by applicants has shown that switch 28, mounted at an angle A of 16 degrees, will close when deceleration of the vehicle 10 equals or exceeds 0.29 g, corresponding to a normal fast stop of the vehicle.

Switch 30 is mounted at an angle B with respect to the horizontal plane 27. Applicants prefer that angle B is approximately 23 degrees, although other angles may be utilized without departing from the principles of the present invention. Testing by applicants has shown that switch 30, mounted at an angle B of 23 degrees, will close when deceleration of the vehicle 10 equals or exceeds 0.42 g, corresponding to a rapid stop of the vehicle.

Switch 32 is mounted at an angle C with respect to the horizontal plane 27. Applicants prefer that angle C is approximately 29 degrees, although other angles may be utilized without departing from the principles of the present invention. Testing by applicants has shown that switch 32, mounted at an angle C of 29 degrees, will close when deceleration of the vehicle 10 equals or exceeds 0.55 g, corresponding to an emergency stop of the vehicle.

Referring additionally now to FIG. 3, a circuit diagram of the signal generator 24 is representatively illustrated. It may now be fully appreciated that the switches 28, 30, and 32 are connected in parallel with each other. In addition, each switch 28, 30, and 32 is series connected to a respective voltage divider 86, 66, and 70, and a respective diode 58, 68, and 72. As hereinabove described, the line 22 is connected to the brake switch 20 (see FIG. 2) and, therefore, closure of any of the switches 28, 30, and 32 produces no effect in the signal generator 24 unless the brake switch is also closed.

Switch 28 is also connected to one of four two-input Schmitt triggers 34, 36, 38, and 40 included within an integrated circuit 42. Applicants prefer that the integrated circuit 42 is a CMOS CD4093, although other components may be utilized without departing from the principles of the present invention, for example, triggers 34, 36, 38, and 40 may be NAND gates or inverted AND gates, and may be discreet components. In the illustrated preferred embodiment of the signal generator 24, each of the triggers 34, 36, 38, and 40 have a low output only when both of its inputs are high, otherwise its output is high. Where used herein, the term "Schmitt trigger" and "trigger" shall be construed broadly to include a Schmitt trigger, a NAND gate, an inverted AND gate, a combination of discreet components which perform the function of a NAND gate, or any functional equivalent thereof.

The outputs of triggers 34 and 38 are connected to a conventional oscillator 54. The oscillator 54 is of the type well known in the art which produces a frequency output corresponding to a voltage input. The particular relationship between the voltage input and the frequency output is determined by resistor 88 and capacitor 62 connected thereto according to the particular oscillator manufacturer's operational instructions.

The voltage input of oscillator 54 is connected to the outputs of the diodes 58, 68, and 72. In this manner, as each of the switches 28, 30, and 32 successively closes, successively greater voltage is input to the oscillator 54, thereby producing successively greater frequency output from the oscillator. Applicants prefer that the oscillator 54 output a frequency of 1.25 Hz when the switch 28 is closed, a frequency of 2.00 HZ when the switches 28 and 30 are closed, and a frequency of 2.83 Hz when the switches 28, 30, and 32 are closed, although it is to be understood that other frequencies may be utilized in the signal generator 24 without departing from the principles of the present invention. Applicants have found that the above-listed frequencies are useful in signalling increased levels of danger to following drivers due to increased levels of deceleration of the vehicle 10.

The output of the oscillator 54 is connected via a diode 84 to a power transistor 50. The transistor 50 controls application of current from line 64 (connected to the battery 18, see FIG. 2) to line 26 (connected to the light 90). Thus, when the oscillator 54 is activated to supply a frequency output to the transistor 50, the light 90 is made to flash at the desired predetermined frequency.

The output of trigger 40 is also connected to the transistor 50. As will be more fully described hereinbelow, the output of the trigger 40 is high when the brake switch 20 is closed and all of the switches 28, 30, and 32 are open. Thus, current is continuously supplied to the light 90 when the vehicle's brakes are applied, but the vehicle's deceleration is not sufficient to cause any of the switches 28, 30, or 32 to close, corresponding to a normal slow stop of the vehicle 10.

One of the inputs of trigger 34 is connected to switch 28, and the other of the inputs is connected to line 64. Therefore, one of the inputs is always high (as long as voltage is supplied to line 64), and one of the inputs is high when the vehicle's deceleration is sufficient to cause closure of switch 28. Thus, the output of trigger 34 will be high when switch 28 is open, and low when switch 28 is closed. The output of trigger 34 is connected to the gate input of the oscillator 54, so that the oscillator is activated when the output of trigger 34 goes low, and is deactivated when the output of trigger 34 goes high.

The inputs of trigger 36 are connected to the output of trigger 34, and to line 22. Therefore, one of the inputs is high when the brake switch 20 is closed, and one of the inputs is low when switch 28 is closed. Thus, the output of trigger 36 is only low when the brake switch 20 is closed, but the vehicle's deceleration is not great enough to close switch 28.

The inputs of trigger 38 are connected to the output of trigger 34, and to line 64. Therefore, one of the inputs is always high, and the other of the inputs is low when switch 28 is closed. Thus, the output of trigger 38 is only high when the brake switch 20 is closed and the switch 28 is closed.

The inputs of trigger 40 are connected to the output of trigger 36, and to line 64. Therefore, one of the inputs is always high, and one of the inputs is low only when the brake switch 20 is closed and switch 28 is open. Thus, the output of trigger 40 is high only when the vehicle's brakes are applied, but the vehicle's deceleration is not sufficient to close switch 28. In this manner, current is supplied to the light 90 when the above conditions are met, but control of the current supplied to the light 90 is turned over to the oscillator 54 as soon as switch 28 closes.

38 is low, that is, when the brake switch 20 is open or when the brake switch 20 is closed but the vehicle's deceleration is insufficient to close the switch 28.

If the brake switch 20 and the switch 28 have been closed as hereinabove described, and the brake switch 20 is then opened (such as when the vehicle's brakes are released following a normal fast stop), capacitor 74 will discharge, thereby producing a sharp negative pulse at an input of a conventional timer 78 interconnected between the capacitor 74 and diode 44. The timer 78 input is also connected to line 64 via a resistor 76. The negative pulse triggers the timer 78 to generate an output pulse, the duration of which is determined by resistor 80 and capacitor 82 connected to the timer according to the timer manufacturer's operating instructions. Applicants prefer that the resistor 80 and capacitor 82 be sized so that the output pulse has a duration of approximately three to six seconds, although other pulse durations may be utilized without departing from the principles of the present invention.

The timer 78 output pulse is connected via diode 44 to an input of trigger 34. Thus, the output of trigger 34 is maintained low for approximately three to six seconds after the brake switch 20 has opened. Since the output of trigger 34 is connected to the gate input of the oscillator 54, and the capacitor 60 is fully charged to the voltage last applied to the oscillator voltage input, the oscillator will continue to produce a frequency output corresponding to the voltage at its voltage input before the brake switch 20 was opened. Therefore, the light 90 continues to flash for a predetermined time after the brake switch 20 is opened, and flashes during that time at the same frequency as it flashed just prior to the brake switch 20 being opened.

TABLE 1

| | SWITCHES | | | | SCHMITT TRIGGERS | | | | | | | | TRANS. |
|---|---|---|---|---|---|---|---|---|---|---|---|---|---|
| | | | | | 34 | | 36 | | 38 | | 40 | | |
| | 20 | 28 | 30 | 32 | IN | OUT | IN | OUT | IN | OUT | IN | OUT | 50 |
| BRAKE NOT APPLIED | OFF | OFF | OFF | OFF | H&L | H | H&L | H | H&H | L | H&H | L | OFF |
| BRAKE APPLIED; DECELERATION < .29G | ON | OFF | OFF | OFF | H&L | H | H&H | L | H&H | L | L&H | H | ON |
| BRAKE APPLIED; .42G > DECELERATION ≥ .29G | ON | ON | OFF | OFF | H&H | L | L&H | H | H&L | H | H&H | L | 1.25 HZ |
| BRAKE APPLIED; .55G > DECELERATION ≥ .42G | ON | ON | ON | OFF | H&H | L | L&H | H | H&L | H | H&H | L | 2.00 HZ |
| BRAKE APPLIED; DECELERATION ≥ .55G | ON | ON | ON | ON | H&H | L | L&H | H | H&L | H | H&H | L | 2.83 HZ |
| IMMEDIATELY FOLLOWING BRAKE RELEASE | OFF | OFF | OFF | OFF | H&L | H | H&L | H | H&H | L | H&H | L | LAST HZ |

Table 1 summarizes the above description of the signal generator 24. Note that transistor 50 (and, thus, the light 90) is initially off when the brake switch 20 is open (e.g., "off"), is "on" when the brake switch is "on" and all of the switches 28, 30, and 32 are "off", is cycling at 1.25 Hz when the brake switch 20 and switch 28 are "on" and switches 30 and 32 are "off", is cycling at 2.00 Hz when the brake switch 20 and switches 28 and 30 are "on" and switch 32 is "off", and is cycling at 2.83 Hz when the brake switch 20 and all of the switches 28, 30, and 32 are "on".

Various additional components of the signal generator 24 contribute to its operation. A capacitor 60 smooths small voltage variations input to the oscillator 54. A resistor 56 produces a desired voltage drop in the voltage dividers 86, 66, and 70. Diodes 44, 46, 48, and 52 permit current flow in desired directions. Diode 52 permits the voltage input of the oscillator 54 to be pulled low when the output of the trigger When the timer 78 output pulse expires, the output of trigger 34 goes high. The gate input of the oscillator 54 likewise goes high and the frequency output of the oscillator terminates. Accordingly, the transistor 50 ceases supplying power to the light 90 via line 26. The output of trigger 38 goes low, permitting the capacitor 60 to be discharged via diode 52.

Thus has been described the vehicle 10 incorporating the deceleration rate signal generator 24 therein. The signal generator 24 may also be conveniently retrofit into existing vehicles. Use of the signal generator 24 permits the light 90 to be lighted when the brake switch 20 is closed, permits the light 90 to be continuously lighted when the brake switch 20 is closed and the vehicle's deceleration is below a first predetermined level, permits the light 90 to be flashed at a first predetermined frequency when the brake switch 20 is closed and the vehicle's deceleration is above the first predetermined level but below a second predetermined level, permits the light 90 to be flashed at a second predetermined frequency when the brake switch 20 is closed and the vehicle's deceleration is above the second predetermined level but below a third predetermined level, permits the light 90 to be flashed at a third predetermined frequency when the brake switch 20 is closed and the vehicle's deceleration is above the third predetermined level, and permits the light 90 to be flashed after the brake switch 20 is opened, the light 90 flashing at the same frequency as it flashed before the brake switch 20 was opened. These and other benefits and features of the present invention will be apparent to one of ordinary skill in the art upon careful consideration of the above description of the vehicle 10 and signal generator 24.

Figure 5:
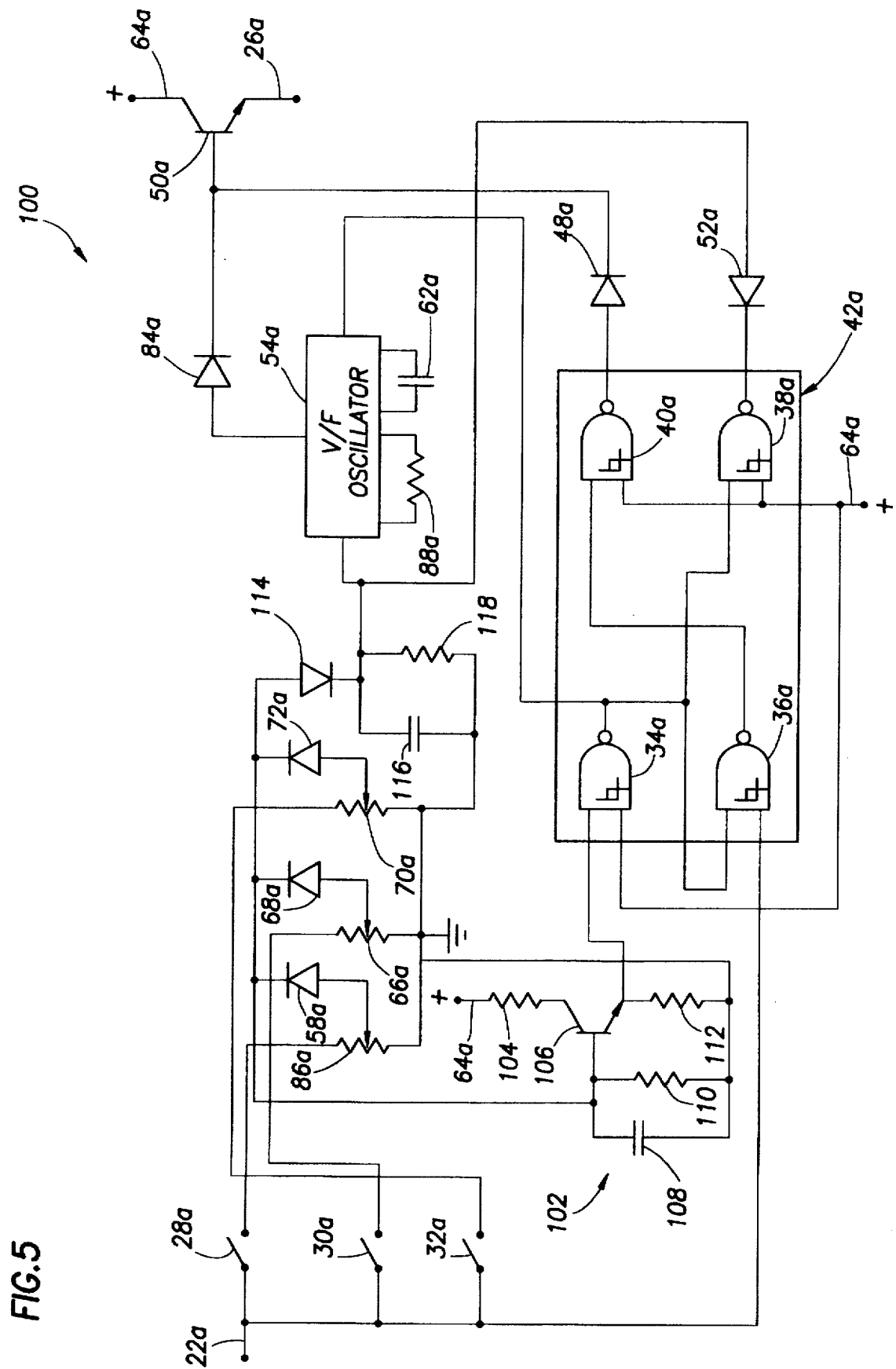
FIG. 5 is a circuit diagram of a second deceleration rate signal generator embodying principles of the present invention, the signal generator being usable in the brake light system of FIG. 2.

Referring additionally now to FIG. 5, a circuit diagram is representatively illustrated of a deceleration rate signal generator 100. The signal generator 100 may be used in the vehicle 10 in place of the signal generator 24. Components of the signal generator 100 which are similar to previously-described components of the signal generator 24 are indicated in FIG. 5 utilizing the same reference numerals as previously used, with an added suffix "a".

In the signal generator 100, each of the switches 28a, 30a, and 32a are connected to respective voltage dividers 86a, 66a, and 70a. Diodes 58a, 68a, and 72a are connected to the respective voltage dividers 86a, 66a, and 70a. A diode 114 connects the diodes 58a, 68a, and 72a to the voltage input of the oscillator 54a. Thus, as each of the switches 28a, 30a, and 32a is successively closed, successively greater voltage is applied to the oscillator 54a voltage input.

The diodes 58a, 68a, and 72a are also connected to the base of a transistor 106, the collector of which is connected via a resistor 104 to line 64a, and the emitter of which is connected to an input of the trigger 34a. Thus, if switch 28a is closed, transistor 106 conducts and the output of trigger 34a goes low.

Switches 28a, 30a, and 32a are also connected through the respective voltage dividers 86a, 66a, and 70a to a capacitor, the other side of which is connected to the diodes 58a, 68a, and 72a. The capacitor 108 is charged whenever one or more of the switches 28a, 30a, and 32a are closed and the brake switch 20 is also closed. Resistor 110 and capacitor 108 form an RC network, the purpose of which is to continue to supply adequate voltage, via a resistor 112, to one of the inputs of the trigger 34a to maintain the output of trigger 34a at a low state for a period of time after the brake switch 20 has been opened. The output of trigger 34a being connected to the gate input of the oscillator 54a, maintenance of such low state permits the oscillator 54a to continue outputting a frequency corresponding to the voltage applied at its voltage input after the brake switch 20 has been opened. The frequency output of the oscillator 54a is connected via diode 84a to the transistor 50a, which enables current to pass from line 64a to line 26a in order to light the light 90.

When the vehicle's brakes are applied, voltage from the brake switch 20 is applied to line 22a. If the deceleration of the vehicle 10 is less than that required to close switch 28a, the output of trigger 40a is high, and the transistor 50a conducts from line 64a to line 26a, thereby lighting the light 90.

If the vehicle 10 is decelerating at a rate great enough to close switch 28a, voltage will be applied through voltage divider 86a, diode 58a, and diode 114 to the voltage input of the oscillator 54a. The oscillator 54a then oscillates at a rate corresponding to the voltage on its voltage input, as determined by resistor 88a and capacitor 62a. The voltage is also applied to the base of transistor 106. As long as the voltage from transistor 106 is applied to an input of trigger 34a, the pulse output of the oscillator 54a will continue to be supplied to the transistor 50a.

If the deceleration of the vehicle 10 is sufficient to close additional switches 30a and/or 32a, greater voltage is applied to the voltage input of the oscillator 54a, and the pulse output of the oscillator 54a is at a greater frequency, corresponding to the greater voltage. In this regard, operation of the signal generator 100 is similar to operation of the previously-described signal generator 24.

When voltage is no longer supplied through any of the switches 28a, 30a, or 32a (as, for example, when the brake switch 20 is opened), capacitors 116 and 108 are fully charged to voltages corresponding to voltages supplied thereto when the brake switch 20 and one or more of the switches 28a, 30a, and 32a were closed. The voltage on capacitor 116 is isolated by diode 114 and will remain at its same voltage until discharged through diode 52a when the output of trigger 38a goes low. Thus, the pulse rate at the output of the oscillator 54a after the brake switch 20 is opened corresponds to the pulse rate just prior to the brake switch being opened.

The voltage on capacitor 108 preferably maintains transistor 106 conducting as long as that voltage stays above about one volt. The charge on capacitor 108 begins to discharge through resistor 110 as soon as the brake switch 20 is opened. Since the charge on capacitor 108 varies depending on which switches 28a, 30a, and 32a were closed when the brake switch 20 was closed, the discharge time of capacitor 108 corresponds to which of the switches 28a, 30a, and 32a were closed just prior to the brake switch 20 opening. Thus, the oscillator 54a is made to continue its pulse output for a period of time which corresponds to the rate of deceleration of the vehicle 10, after the vehicle's brakes are released.

Thus has been described the deceleration rate signal generator 100 which may be incorporated into the vehicle 10. The signal generator 100 may also be conveniently retrofit into existing vehicles. Use of the signal generator 100 permits the light 90 to be lighted when the brake switch 20 is closed, permits the light 90 to be continuously lighted when the brake switch 20 is closed and the vehicle's deceleration is below a first predetermined level, permits the light 90 to be flashed at a first predetermined frequency when the brake switch 20 is closed and the vehicle's deceleration is above the first predetermined level but below a second predetermined level, permits the light 90 to be flashed at a second predetermined frequency when the brake switch 20 is closed and the vehicle's deceleration is above the second predetermined level but below a third predetermined level, permits the light 90 to be flashed at a third predetermined frequency when the brake switch 20 is closed and the vehicle's deceleration is above the third predetermined level, and permits the light 90 to be flashed after the brake switch 20 is opened, the light 90 flashing at the same frequency as it flashed before the brake switch 20 was opened. Additionally, the signal generator 100 permits the light 90 to be flashed after the brake switch 20 is opened for a period of time corresponding to the rate of deceleration of the vehicle 10 just prior to the brake switch 20 being opened. These and other benefits and features of the present invention will be apparent to one of ordinary skill in the art upon careful consideration of the above description of the vehicle 10 and signal generator 100.

The foregoing detailed description is to be clearly understood as being given by way of illustration and example only, the spirit and scope of the present invention being limited solely by the appended claims.

What is claimed is:

1. A vehicle, comprising:
   a voltage source;
   a brake switch connected to said voltage source;
   a plurality of inertial switches, said inertial switches being configured to close successively in response to successively increasing levels of deceleration of the vehicle, and each of said inertial switches being connected to said brake switch;
   a plurality of voltage dividers, each of said voltage dividers being connected to one of said inertial switches;
   an oscillator having a voltage input, a gate input, and an output, said oscillator voltage input being connected to each of said voltage dividers; and
   four Schmitt triggers, each of said Schmitt triggers having first and second inputs and an output,
      a first one of said Schmitt triggers having its first input connected to one of said inertial switches, its second input connected to said voltage source, and its output connected to said gate input of said oscillator,
      a second one of said Schmitt triggers having its first input connected to said first Schmitt trigger output, and its second input connected to said brake switch,
      a third one of said Schmitt triggers having its first input connected to said second Schmitt trigger output, and its second input connected to said voltage source, and
      a fourth one of said Schmitt triggers having its first input connected to said first Schmitt trigger output, its second input connected to said voltage source, and its output connected to said oscillator voltage input.

2. The vehicle according to claim 1, further comprising a capacitor connected between said oscillator voltage input and each of said voltage dividers, said capacitor being charged when said brake switch is closed and at least one of said inertial switches is closed.

3. The vehicle according to claim 2, wherein said capacitor is dischargeable when said fourth Schmitt trigger output goes low.

4. The vehicle according to claim 1, further comprising:
   a light; and
   a transistor having a base, a collector, and an emitter, said base being connected to said oscillator output, said collector being connected to said voltage source, and said emitter being connected to said light.

5. The vehicle according to claim 4, wherein said third Schmitt trigger output is connected to said transistor base.

6. A deceleration rate signal generator for use with a vehicle having a voltage source, a brake switch connected to the voltage source, and a light connectable to the voltage source, the deceleration rate signal generator comprising:
   a plurality of inertial switches, said inertial switches being configured to close successively in response to successively increasing levels of deceleration of the vehicle, and each of said inertial switches being connectable to the brake switch;
   a plurality of voltage dividers, each of said voltage dividers being connected to one of said inertial switches;
   an oscillator having a voltage input, a gate input, and an output, said oscillator voltage input being connected to each of said voltage dividers; and
   four Schmitt triggers, each of said Schmitt triggers having first and second inputs and an output,
      a first one of said Schmitt triggers having its first input connected to one of said inertial switches, its second input being connectable to the voltage source, and its output connected to said gate input of said oscillator,
      a second one of said Schmitt triggers having its first input connected to said first Schmitt trigger output, and its second input being connectable to the brake switch,
      a third one of said Schmitt triggers having its first input connected to said second Schmitt trigger output, and its second input being connectable to the voltage source, and
      a fourth one of said Schmitt triggers having its first input connected to said first Schmitt trigger output, its second input being connectable to the voltage source, and its output connected to said oscillator voltage input.

7. The deceleration rate signal generator according to claim 6, further comprising a capacitor connected between said oscillator voltage input and each of said voltage dividers, said capacitor being chargeable when the brake switch is closed and at least one of said inertial switches is closed.

8. The deceleration rate signal generator according to claim 7, wherein said capacitor is dischargeable when said fourth Schmitt trigger output goes low.

9. The deceleration rate signal generator according to claim 6, further comprising:
   a transistor having a base, a collector, and an emitter, said base being connected to said oscillator output, said collector being connectable to the voltage source, and said emitter being connectable to the light.

10. The deceleration rate signal generator according to claim 9, wherein said third Schmitt trigger output is connected to said transistor base.

11. A vehicle, comprising:
   a voltage source;
   a brake switch connected to said voltage source;
   a plurality of inertial switches, said inertial switches being configured to close successively in response to successively increasing levels of deceleration of the vehicle, and each of said inertial switches being connected to said brake switch;
   a plurality of voltage dividers, each of said voltage dividers being connected to one of said inertial switches;
   an oscillator having a voltage input, a gate input, and an output, said oscillator voltage input being connected to each of said voltage dividers;
   a first transistor having a base, a collector, and an emitter, said first transistor base being connected to each of said voltage dividers, and said first transistor collector being connected to said voltage source; and
   four Schmitt triggers, each of said Schmitt triggers having first and second inputs and an output,
      a first one of said Schmitt triggers having its first input connected to said first transistor emitter, its second input connected to said voltage source, and its output connected to said gate input of said oscillator,
      a second one of said Schmitt triggers having its first input connected to said first Schmitt trigger output, and its second input connected to said brake switch,
      a third one of said Schmitt triggers having its first input connected to said second Schmitt trigger output, and its second input connected to said voltage source, and a fourth one of said Schmitt triggers having its first input connected to said first Schmitt trigger output, its second input connected to said voltage source, and its output connected to said oscillator voltage input.

12. The vehicle according to claim 11, further comprising a capacitor connected between said oscillator voltage input and each of said voltage dividers, said capacitor being charged when said brake switch is closed and at least one of said inertial switches is closed.

13. The vehicle according to claim 12, wherein said capacitor is dischargeable when said fourth Schmitt trigger output goes low.

14. The vehicle according to claim 11, further comprising:
  a light; and
  a second transistor having a base, a collector, and an emitter, said second transistor base being connected to said oscillator output, said second transistor collector being connected to said voltage source, and said second transistor emitter being connected to said light.

15. The vehicle according to claim 14, wherein said third Schmitt trigger output is connected to said second transistor base.

16. The vehicle according to claim 11, further comprising a capacitor connected to said first transistor base and to said first transistor emitter, whereby said capacitor is capable of being charged to a voltage when said first transistor base is connected to said voltage source, and whereby said capacitor is capable of supplying said voltage to said first transistor emitter when said first transistor base is disconnected from said voltage source.

17. A deceleration rate signal generator for use with a vehicle having a voltage source, a brake switch connected to the voltage source, and a light connectable to the voltage source, the deceleration rate signal generator comprising:

a plurality of inertial switches, said inertial switches being configured to close successively in response to successively increasing levels of deceleration of the vehicle, and each of said inertial switches being connectable to the brake switch;

a plurality of voltage dividers, each of said voltage dividers being connected to one of said inertial switches;

an oscillator having a voltage input, a gate input, and an output, said oscillator voltage input being connected to each of said voltage dividers;

a first transistor having a base, a collector, and an emitter, said first transistor base being connected to each of said voltage dividers, and said first transistor collector being connectable to the voltage source; and four Schmitt triggers, each of said Schmitt triggers having first and second inputs and an output,
    a first one of said Schmitt triggers having its first input connected to said first transistor emitter, its second input being connectable to the voltage source, and its output connected to said gate input of said oscillator,
    a second one of said Schmitt triggers having its first input connected to said first Schmitt trigger output, and its second input being connectable to the brake switch,
    a third one of said Schmitt triggers having its first input connected to said second Schmitt trigger output, and its second input being connectable to the voltage source, and a fourth one of said Schmitt triggers having its first input connected to said first Schmitt trigger output, its second input being connectable to the voltage source, and its output connected to said oscillator voltage input.

18. The deceleration rate signal generator according to claim 17, further comprising a capacitor connected between said oscillator voltage input and each of said voltage dividers, said capacitor being chargeable when the brake switch is closed and at least one of said inertial switches is closed.

19. The deceleration rate signal generator according to claim 18, wherein said capacitor is dischargeable when said fourth Schmitt trigger output goes low.

20. The deceleration rate signal generator according to claim 17, further comprising:
  a second transistor having a base, a collector, and an emitter, said second transistor base being connected to said oscillator output, said second transistor collector being connectable to the voltage source, and said second transistor emitter being connectable to the light.

21. The deceleration rate signal generator according to claim 20, wherein said third Schmitt trigger output is connected to said second transistor base.

22. The deceleration rate signal generator according to claim 17, further comprising a capacitor connected to said first transistor base and to said first transistor emitter, whereby said capacitor is capable of being charged to a voltage when said first transistor base is connected to said voltage source, and whereby said capacitor is capable of supplying said voltage to said first transistor emitter when said first transistor base is disconnected from the voltage source.

23. A deceleration rate signal generator, comprising:
  means capable of sensing successive levels of deceleration of a vehicle;
  means for generating a frequency output, said generating means being connected to said sensing means, and said frequency output being capable of having levels thereof corresponding to said levels of deceleration; and
  means, connected to said generating means, for continuing said frequency output for a predetermined period of time after said sensing means discontinues sensing deceleration of the vehicle, said continuing means including a capacitor coupled between said sensing means and an oscillator of said generating means, said capacitor being charged to voltages corresponding to said levels of deceleration.

24. The deceleration rate signal generator according to claim 23, wherein said continuing means is capable of continuing said frequency output at said level thereof corresponding to a level of deceleration sensed by said sensing means immediately prior to said sensing means discontinuing sensing deceleration of the vehicle.

25. The deceleration rate signal generator according to claim 23, further comprising means, connected to said sensing means, for adjusting a length of said predetermined period of time, whereby said length corresponds to a level of deceleration sensed by said sensing means immediately prior to said sensing means discontinuing sensing deceleration of the vehicle.

* * * * *